(12) United States Patent
Meegan et al.

(10) Patent No.: US 9,006,311 B2
(45) Date of Patent: Apr. 14, 2015

(54) DISPERSION METHOD FOR THE PREPARATION OF PARTICLE REINFORCED POLYMER COMPOSITIONS

(75) Inventors: Jonathan Edward Meegan, Chester (GB); Olivia Smith, Wirral (GB)

(73) Assignee: Cytec Engineered Materials Limited, Wrexham Clwyd (GB)

( * ) Notice: Subject to any disclaimer, the term of this patent is extended or adjusted under 35 U.S.C. 154(b) by 243 days.

(21) Appl. No.: 13/349,134

(22) Filed: Jan. 12, 2012

(65) Prior Publication Data

US 2012/0184648 A1    Jul. 19, 2012

(30) Foreign Application Priority Data

Jan. 13, 2011    (GB) ................................ 1100568.3

(51) Int. Cl.
| | |
|---|---|
| *C08J 3/215* | (2006.01) |
| *C08J 3/05* | (2006.01) |
| *C08K 7/16* | (2006.01) |
| *C08L 63/00* | (2006.01) |
| *C08J 3/00* | (2006.01) |
| C08G 59/18 | (2006.01) |

(52) U.S. Cl.
CPC . *C08J 3/215* (2013.01); *C08K 7/16* (2013.01); *C08L 63/00* (2013.01); *C08G 59/18* (2013.01); *C08J 3/005* (2013.01); *C08J 2363/00* (2013.01); *C08J 2379/04* (2013.01); *C08J 2379/08* (2013.01)

(58) Field of Classification Search
CPC .............. C08J 3/005; C08J 3/02; C08J 3/03; C08J 3/09; C08J 3/11; C08J 3/215; C08K 7/00; C08K 7/16; C08L 63/00; C08G 59/18
See application file for complete search history.

(56) References Cited

U.S. PATENT DOCUMENTS

| | | | |
|---|---|---|---|
| 4,778,851 A * | 10/1988 | Henton et al. | ........... 525/65 |
| 4,980,234 A | 12/1990 | Almer et al. | |
| 2003/0134943 A1 | 7/2003 | Labarre et al. | |
| 2007/0251419 A1 | 11/2007 | Yamaguchi et al. | |
| 2008/0188609 A1 | 8/2008 | Agarwal et al. | |
| 2012/0142820 A1 | 6/2012 | Yamaguchi et al. | |

FOREIGN PATENT DOCUMENTS

| | | | |
|---|---|---|---|
| DE | 102004019430 A1 | 11/2005 | |
| EP | 0477635 A2 | 4/1992 | |
| EP | 1632533 A1 | 3/2006 | |
| FR | 2934866 A1 | 2/2010 | |
| GB | 722802 | 2/1955 | |
| GB | 1095776 A | 12/1967 | |
| JP | 2004315572 A * | 11/2004 | ............ C08L 63/00 |
| JP | 2010-196018 A | 9/2010 | |
| WO | 2008087467 A1 | 7/2008 | |
| WO | 2010/138440 A1 | 12/2010 | |

OTHER PUBLICATIONS

Machine translation of JP 2004315572 A, provided by the JPO website (no date).*
Partial translation of JP 2004-315572 A (paragraphs 0080-0084), provided by USPTO translations (no date).*
ISR/Written Opinion for PCT/EP2012/050178 mailed on Mar. 19, 2012.
International Search Report. PCT/EP2012/050178. Mar. 19, 2012.
Database WPI, Week 201063, Thomson Scientific, London GB; AN 2010-L46025. Sep. 9, 2010.

* cited by examiner

*Primary Examiner* — Michael J Feely
(74) *Attorney, Agent, or Firm* — Thi D. Dang (57) ABSTRACT

Method of preparing a particle dispersion within a polymer is disclosed. The dispersion may include core shell rubber particles and the polymer may include epoxies. The particles are capable of being substantially dispersed within the polymer so as to substantially inhibit agglomeration of the particles. Mechanical properties, such as toughness are improved while glass transition temperature and viscosity are not substantially impaired by the presence of the particles.

19 Claims, 10 Drawing Sheets

DISPERSION METHOD FOR THE PREPARATION OF PARTICLE REINFORCED POLYMER COMPOSITIONS

CROSS-REFERENCE TO RELATED APPLICATION

This application claims benefit of priority from United Kingdom Application No. 1100568.3, filed Jan. 13, 2011.

BACKGROUND OF THE INVENTION

1. Field of the Invention

Embodiments of the present disclosure pertain to mechanically reinforced polymer compositions and, in particular, to systems and methods for preparing dispersions of core shell rubber particles in polymer compositions such as epoxy resins.

2. Description of the Related Art

Thermoset polymer matrices, such as epoxies, are used extensively in a variety of retail and commercial products, owing to their good combination of mechanical and chemical properties (e.g., strength, glass transition temperature, modulus, resistance to chemical attack, etc.). A thermoset epoxy network may be formed from two different chemical compounds, referred to as a resin and a hardener. The resin may comprise monomers or short chain polymers having an epoxide group at either end, while the hardener may comprise compounds including a nitrogen atom linked to two hydrogen atoms (e.g., an amine group, —$NH_2$). The lone pair of electrons from the nitrogen attacks the epoxy group, leaving active hydrogen from the amine to form ether linkages, crosslinking the material, giving the epoxy its strength.

Unfortunately, cured epoxy resins typically exhibit brittle fracture. For example, epoxies exhibit poor fracture toughness (e.g., less than about 1 MPa $m^{1/2}$), poor resistance to crack propagation, and low impact strength. Planes of weakness may arise from the structuring of the highly cross-linked material and fracture propagates easily along these planes. The higher the cross-link density of the material, the less likely plastic deformation will occur and the more likely the epoxy material will be susceptible to crack propagation and catastrophic failure. This relatively low resistance to fracture and impact limits the application of epoxies.

SUMMARY

In an embodiment, a method of dispersing particles within a polymer is provided. The method comprises combining one or more selected particles with an organic liquid to form a particle mixture. The method further comprises adding a polymer mixture comprising the organic liquid and the polymer to the particle mixture to form a particle-polymer mixture. The method additionally comprises adding a salt to the polymer-particle mixture. The method also comprises substantially removing the organic and aqueous layers of the polymer-particle mixture to yield a dispersion of the particles within the polymer.

In another embodiment, a method of preparing a particle reinforced composite is provided. The method comprises providing a core-shell rubber particle comprising an inner core and an outer shell, wherein the inner core and outer shell are formed from methacrylate functionalized monomers. The method further comprises combining the core shell rubber particles with a first organic liquid. The method additionally comprises adding the core shell rubber particles and the first organic liquid to a mixture of an epoxy monomer and the first organic liquid to form a particle-epoxy mixture. The method also comprises inducing separation of organic and aqueous layers within the particle-epoxy mixture. The method additionally comprises thermally curing a particle epoxy dispersion resulting from removal of the separated organic and aqueous layers in combination with a hardener compound.

In a further embodiment, a method of preparing a dispersion of core shell rubber particles within an epoxy is provided. The method comprises, combining one or more core shell rubber particles with methyl ethyl ketone to form a particle mixture. The method also comprises adding an epoxy mixture comprising methyl ethyl ketone and an epoxy to the particle mixture to form a particle-epoxy mixture. The method further comprises adding sodium chloride to the epoxy-particle mixture. The method additionally comprises substantially removing the organic and aqueous layers of the epoxy-particle mixture to yield a dispersion of the particles within the epoxy monomer.

In another embodiment, a method of preparing a particle reinforced composite is provided. The method comprises providing one or more core-shell rubber particles comprising an inner core and an outer shell, wherein the inner core and outer shell are formed from acrylate functionalized monomers in an aqueous emulsion polymerisation process. The method further comprises combining the core shell rubber particles with a first organic liquid. The method additionally comprises adding the core shell rubber particles and the first organic liquid to a mixture of an epoxy monomer and the first organic liquid to form a particle-epoxy mixture. The method also comprises inducing separation of organic and aqueous layers within the particle-epoxy mixture.

DETAILED DESCRIPTION

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 16° C. (60° F.) to 32° C. (90° F.).

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation.

Embodiments of the present disclosure present systems and methods for preparing thermosetting polymer systems comprising well dispersed reinforcing particles. The particle reinforced thermosetting resin may find applicability in fields including, but not limited to, aerospace, automotive or industrial applications.

As discussed above, polymer systems, such as epoxies, are advantageous for many applications, they can also exhibit brittle fracture, which can limit the potential applicability of these materials. Attempts have been made to improve the fracture behavior of polymer materials by adding reinforcing particles to polymer. The presence of discrete particles within the matrix of a thermosetting polymer, such as an epoxy, may enhance the resistance of the polymer to fracture.

However, potential disadvantages may arise when adding particles to polymers. In one aspect, phase separation upon curing of the polymer has been observed, creating areas having thermoplastic, rather than thermosetting character. This potentially lowers the glass-transition temperature ($T_g$) and elastic modulus of the polymer.

In another aspect, particles tend to agglomerate. Agglomerates may be detrimental to the behavior of the cured resin, as they can function as inhomogeneities (e.g., flaws) that concentrate stress and give rise to a reduction in mechanical properties of the resin (e.g., strength, toughness, fatigue, etc.). The use of solvents may be employed in an attempt to address agglomeration behavior within the uncured resin, however, there has been increasing concern within the chemical industry regarding the use and disposal of excess solvents during processing procedures. Thus, identification of processing routes that reduces the use of excess solvents is desirable.

Embodiments of the present disclosure provide systems and methods for dispersing particles within thermosetting resins. In further embodiments, processing parameters are identified that provide particle reinforced, cured resins in which the particles are well dispersed within the cured resin. As discussed in greater detail, these findings indicate that agglomeration, and the attendant reduction in mechanical properties, may be substantially inhibited.

In certain embodiments, processing parameters are identified that result in particle reinforced, uncured resins that exhibit rheologies as a function of temperature that are similar to uncured resins without particles. Similar rheology between the particle reinforced and unreinforced uncured resins indicates that the particle reinforced resins may be handled in a manner similar to the unreinforced resins.

In further embodiments, processing parameters are identified that result in particle reinforced, cured resins that exhibit relatively small changes in $T_g$, as compared to a resin that does not contain the particles. For example, in certain embodiments, the $T_g$ of the particle reinforced, cured resins decreases less than about 15%. These findings further indicate that, the glass transition temperature of the particle reinforced, cured resins are not substantially adversely impacted by addition of the particles to the resin.

As described in further detail below, embodiments of the disclosed dispersion process adds the thermosetting resin towards the beginning of the dispersion operations and employs the resin and an aqueous salt to drive the separation of organic and aqueous layers. This is in contrast to other approaches to preparing particle reinforced thermosetting resins that utilize an organic compound to increase the immiscibility of an organic layer with an aqueous layer and further add the thermosetting resin towards the end of the a processing procedure. It is anticipated that embodiments of the disclosed dispersion processes reduce the expected energy and chemical consumption. Furthermore, the waste stream within the process is less complex and may be easily recycled, if desired. These and other advantages of the present disclosure are described in greater detail below.

Figure 1:
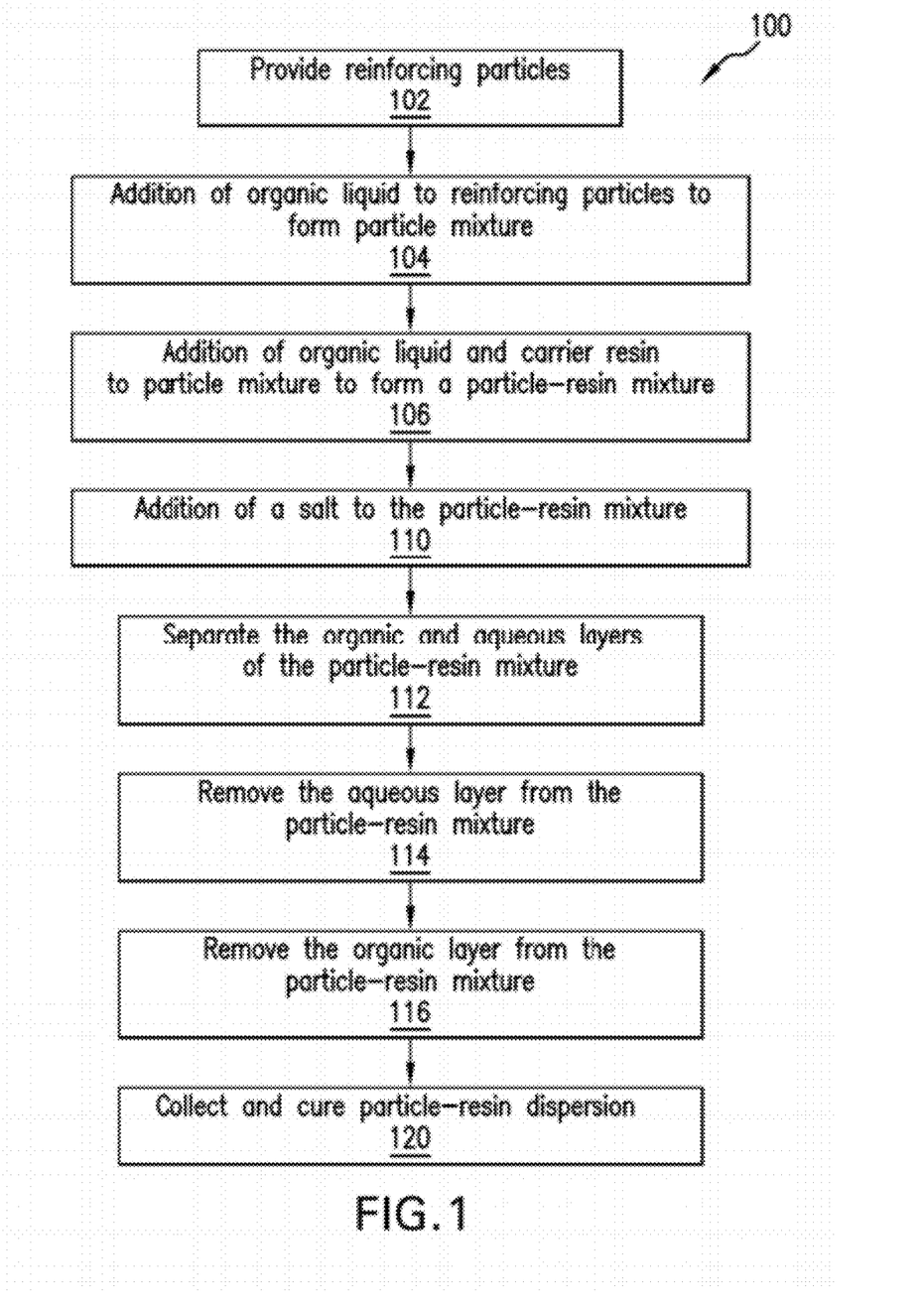
FIG. 1 is an embodiment of a method for dispersion of particles in a thermosetting polymer.

FIG. 1 illustrates one embodiment of a method 100 of preparing a dispersion of particles within a thermosetting polymer. The method 100 includes the operations of providing one or more reinforcing particles in block 102, addition of an organic liquid to the reinforcing particles in block 104, addition of a mixture of the organic liquid and a carrier resin to the particle mixture to form a particle-resin mixture in block 106, addition of a salt to the particle-resin mixture in block 110, separation of the aqueous and organic layers of the particle-resin mixture in block 112, substantial removal of the aqueous layers from the particle-resin mixture in block 114, substantial removal of the organic layers from the particle-resin mixture in block 116, and collection and curing of remaining particle-resin dispersion in block 120. It may be understood that the method 100 may include greater or fewer steps and that the steps of the method 100 may be performed in any order, as necessary.

With providing the one or reinforcing particle in block 102, non-limiting examples of the particles may include, but are not limited to, aqueous colloidal silicas or other inorganic particles, aqueous dispersions of gold nanoparticles or quantum dots, core shell particles, particulate suspensions of thermoplastic particulates.

In certain embodiments, the reinforcing particle may comprise core shell particles. In certain embodiments, the core shell particles may comprise core shell rubber particles that include a core having a polymeric material having an elastomeric or rubber property (i.e., a glass transition temperature less than about 0° C., e.g., less than about −30° C.) surrounded by a shell comprised of a glassy material (i.e., a thermoplastic or thermoset/cross-linked polymer having a glass transition temperature greater than ambient temperatures, e.g., greater than about 50° C.). Examples of core shell particles may be found in U.S. Pat. No. 4,980,234, U.S. Patent Application Publication No. 2008/0188609, and International Patent Publication No. WO/2008/087467, the entirety of each of which is hereby incorporated by reference.

In further embodiments, the core shell particles may be synthesized. The core may be formed from a selected core monomer that has been added to deionized water in a reaction vessel. An initiator may be added to the aqueous phase and, optionally, one or more cross linking agents may be further added with the core monomer. In one embodiment, between about 95% to about 75% of deionized water may be added to one or more core monomers. The core monomer may include but not limited to methacrylate functionalized monomers. The core monomers may be selected from the group consisting of butyl acrylate, isoprene, styrene, siloxane. The core monomer may be provided in a concentration that varies within the range between about 5 to about 25%. In a system where a surfactant is utilized the monomer concentration may increase up to 60%. In another embodiment, the initiator may comprise free radical initiators, including but not limited to: potassium persulfate, 2,2'-Azobis(2-(2-imidazolin), and also redox initiators. The initiator may be provided in a concentration that varies within the range between about 0.03% to about 5%. In a further embodiment, the cross linking agents may comprise divinyl benzene (DVB), ethylene glycol dimethylacrylate (EGDMA), DPHM. The cross-linking agents may be provided in a concentration that varies within the range between about 0% to about 30%.

The core reaction mixture may be agitated using a stirrer at any point in the addition of the components at a rate within the range between about 10 rpm to about 1000 rpm. The reaction vessel may be further heated to a selected temperature, for example, temperatures ranging between about 35° C. to about 90° C. (e.g., about 85° C.). The temperature may be maintained for a selected time, for example, times within the range between about 0.5 h to about 36 h (e.g., about 3.5 h) to allow for polymerization of the cores.

Following the polymerization of the cores, a monomer for the shell may be added to the reaction vessel. The shell monomer may include but is not limited to methacrylate functionalized monomers. Specific examples of shell monomers may be selected from the group consisting of: methyl methacrylate, styrene, and acrylonitrile. The shell monomer may be provided in a concentration that varies within the range between about 1% to about 50%. In a system where a surfactant is utilized the monomer concentration may increase up to 60% In another embodiment, the initiator may comprise free radical initiators including, but not limited to: potassium persulfate, 2,2'-Azobis(2-(2-imidazolin), and redox initiators. The initiator may be provided in a concentration that varies within the range between about 0.03% to about 5%. In a further embodiment, the cross linking agents may be selected from the group consisting of divinyl benzene (DVB), ethylene glycol dimethylacrylate (EGDMA), glycidyl methacrylate (GMA). The cross-linking agents may be provided in a concentration that varies within the range between about 0% to about 50%. Stirring may be maintained during reaction of the shell reactants.

The shell reaction mixture may be further maintained at selected temperature, for example, temperatures ranging between about 35° C. to about 90° C. (e.g., about 85° C. to about 95° C.). The temperature may be maintained for a selected time, for example, times within the range between about 1 h to about 36 h (e.g., about 3.5 h) to allow for polymerization of the shells. Core shell particles formed in this manner may exhibit a particle diameter within the range between about 200 nm to about 300 nm.

The reinforcing particles may be added to an organic liquid in block 106 to form a particle mixture. Embodiments of organic liquid may include, but are not limited to, organic liquid that are substantially water immiscible and having a low boiling point. For example, less than about 90° C. In an embodiment, the solvent may be selected from the group consisting of: esters (e.g., methyl acetate, ethyl acetate, propyl acetate, butyl acetate), ketones (e.g., acetone, methyl ethyl ketone (MEK), diethyl ketone, methyl isobutyl ketone), alcohols (e.g., ethanol, isopropanol, butanol), ethers (tetrahydrofuran, tetrahydropyran, dioxane, diethyl ether), aromatic hydrocarbons (e.g., benzene, toluene, xylene), halogenated hydrocarbons (e.g., methylene chloride, chloroform), and combinations thereof. In certain embodiments, the proportion of the particles added to the organic liquid may range between about two parts of the particles: 0.3 particles of the solvent to about two parts of the particles to two parts of the solvent. The particles may be added to an organic liquid at temperatures ranging between about room temperature to about 35° C.

In block 106, a mixture of the carrier resin and the organic liquid may be added to the particle mixture to form a particle-resin mixture. The proportion of the carrier resin to the organic liquid may vary within the range between about one part carrier resin to about 0.33 parts organic liquid to about one part carrier resin to about one part organic liquid.

In certain embodiments, the carrier resin employed herein may comprise any resins known to those skilled in the art and may include one or more compounds comprising thermoset materials. Examples may include, but are not limited to, epoxies, epoxy curing agents, phenolics, phenols, cyanates, polyimides (e.g., bismaleimide (BMI) and benzoxazines, the like), combinations thereof, and precursors thereof.

Epoxy resins may further include polyepoxides having at least about two 1,2-epoxy groups per molecule. The polyepoxides may be saturated, unsaturated, cyclic, or acyclic, aliphatic, alicyclic, aromatic, or heterocyclic. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolak resin-type.

In block 110, a salt may be added to the particle-resin mixture. The function of the salt is to reduce the miscibility of the aqueous layer in the organic liquid and to drive the separation of the organic and the aqueous layers within the particle-resin mixture. Examples of the salt may include, but are not limited to, sodium chloride, potassium chloride, lithium chloride (water soluble salts). In one embodiment, the salt may be provided in a concentration ranging between about 0.5 M to about 4.5 M. In further embodiments, the amount of salt added vary within the range between about 0.5 parts to about 5 parts.

In blocks 112-116, the organic and aqueous layers of the particle-resin mixture may be allowed to separate and respectively removed from the remaining dispersion of reinforcing particles and resin. For example, in one embodiment, the particle-resin mixture may be shaken and allowed to settle for a selected period of time to phase separate. In certain embodiments, the aqueous layer may be drained from the reaction vessel. In further embodiments, techniques including, but not limited to, rotary evaporation and/or vacuum distillation may be employed to remove at least a portion of the organic layers from the particle-resin mixture.

Curing of dispersed particle-resin mixture may be conducted as known in the art. In one embodiment, the dispersed particle-resin mixture combined with a hardener including, but not limited to, amines, may be degassed and then subjected to heat treatment under a selected temperature, time, and pressure schedule. For example, degassing may be conducted at a temperature that varies within the range between about 60° C. to about 90° C. and a time that varies within the range between about 30 min to about 120 min (e.g., about 90° C. for about 30 minutes). Heat treatment may be conducted at a temperature that varies within the range between about 120° C. to about 180° C. and a time that varies within the range between about 60 min to about 12 h (e.g., a temperature of about 180° C. for about 2 hours using a heating rate within the range between about 2° C. to about 10° C./min.

EXAMPLES

In the examples below, core shell rubber reinforced epoxy composites formed from embodiments of the present disclosure are discussed in detail. Rheological properties of uncured resins containing the core shell rubber particles are examined to identify changes in flow behavior due to introduction of the particles. Microscopy studies (e.g., scanning electron microscopy (SEM)) of cured resins reinforced with the core shell rubber particles are further examined to identify the dispersion of the particles within the resin and potential toughening mechanisms afforded by the particles. Glass transition temperature and toughness measurements of unreinforced and particle reinforced resins are further examined in order to identify the influence of the reinforcing particles on glass transition and toughness behavior.

Table 1 below illustrates sample compositions prepared using formulations of core-shell particles. The core shells were formed using a butyl acrylate monomer to form the core and a methyl methacrylate monomer to form the shell. The particles were varied based upon which cross-linking agent, divinyl benzene (DVB), ethylene glycol dimethylacrylate, or no cross-linking agent (no x-linker) was employed. As discussed in greater detail below, the properties observed in the particle reinforced resin are influenced by the choice of cross-linker. It is hypothesized that, in particular, the shell cross-linking agent influences the interaction between the polymer and the core. The use of DVB as a cross-linking agent results is a relatively more stiff polymer while the use of EGDMA results in a relatively less still polymer.

TABLE 1

Core shell content of sample particle reinforced resins

| Trial | Description |
| --- | --- |
| 9 | No X-Linked Core/No X-Linked Shell |
| 10 | EGDMA Core/No X-Linked Shell |
| 11 | EGDMA Core/EGDMA Shell |
| 12 | DVB Core/No X-Linked Shell |
| 13 | DVB Core/DVB Shell |
| 18 | DVB Core/EGDMA Shell |
| 19 | EGDMA Core/DVB Shell |
| 20 | No X-Linked Core/DVB Shell |
| 21 | No X-Linked Core/EGDMA Shell |

As illustrated below, it is discovered that the particles are well dispersed within the resin. Furthermore, particles with a cross-linked core perform well in terms of glass transition temperature ($T_g$) and rheology. As discussed in greater detail below, those particles cross-linked with a relatively having a relatively more flexible shell, such as those using EGDMA as a cross-linking agent, may outperform those having a more rigid shell, such as those using DVB as a cross-linking agent.

Example 1

Rheology of Particle-resin Mixtures

Figure 2:
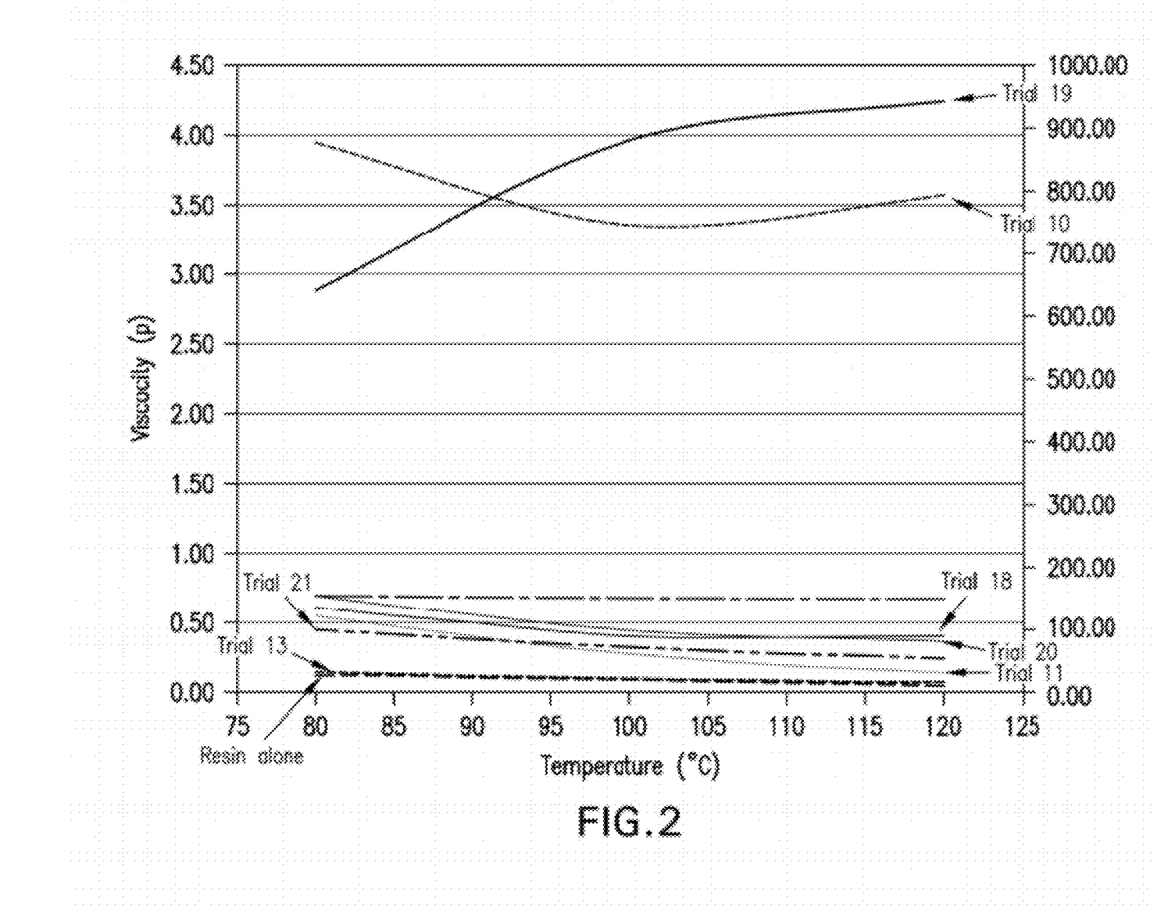
FIG. 2 presents a plot of viscosity as a function of temperature for different core-shell particle-epoxy resin mixtures.
Figure 3A:
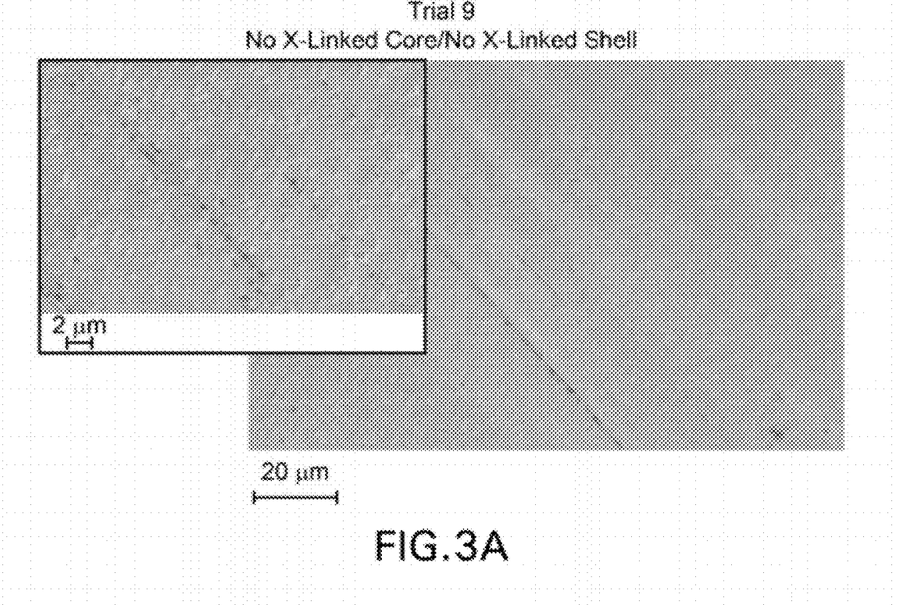
FIGS. 3A-3I present illustrative scanning electron micrographs of polished surfaces of cured epoxies containing different core shell particles illustrating different degrees particle dispersion and agglomeration within the epoxy.
Figure 3B:
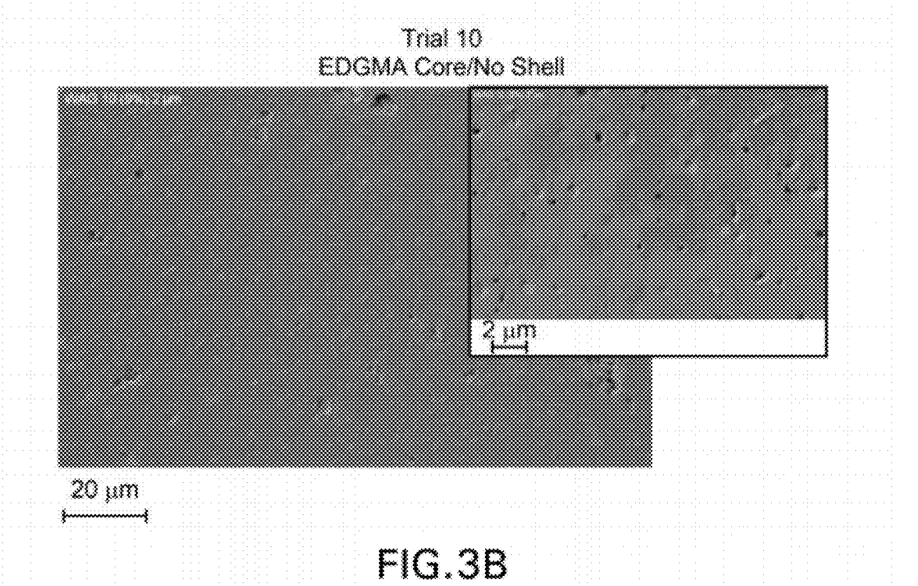
Figure 3C:
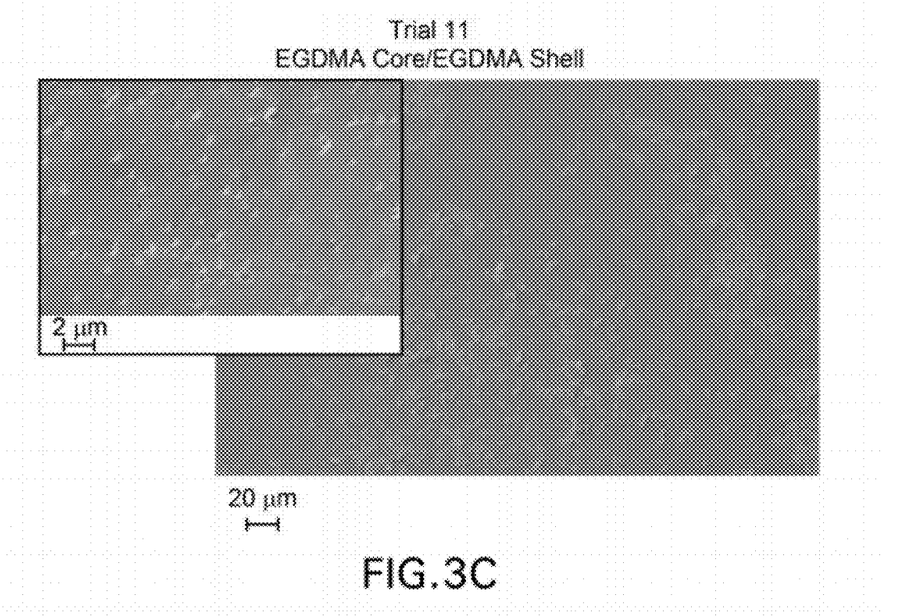
Figure 3D:
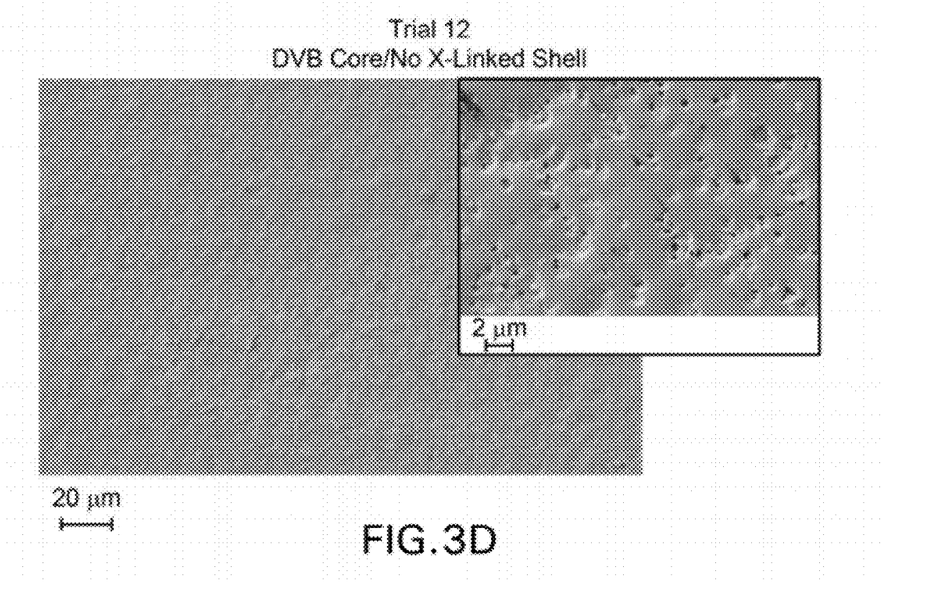
Figure 3E:
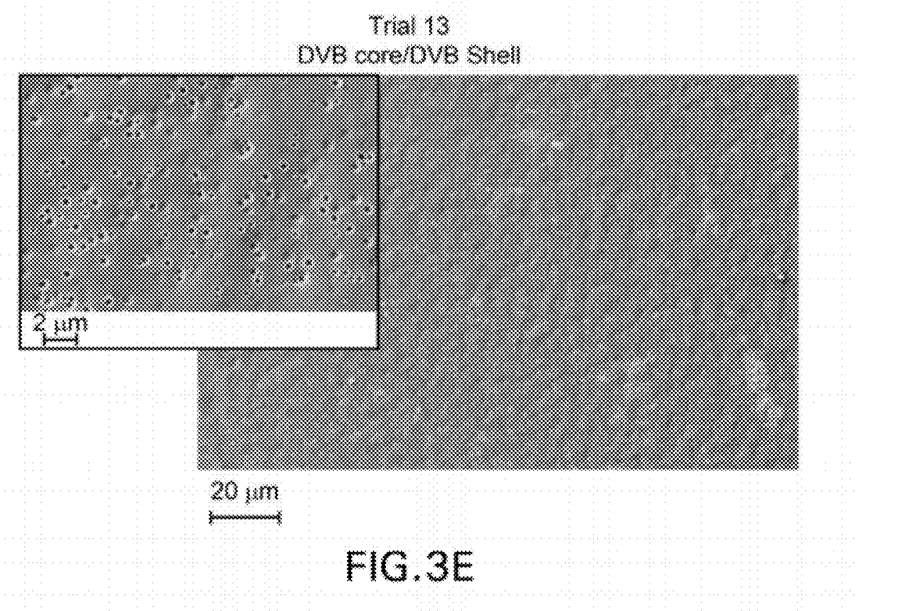
Figure 3F:
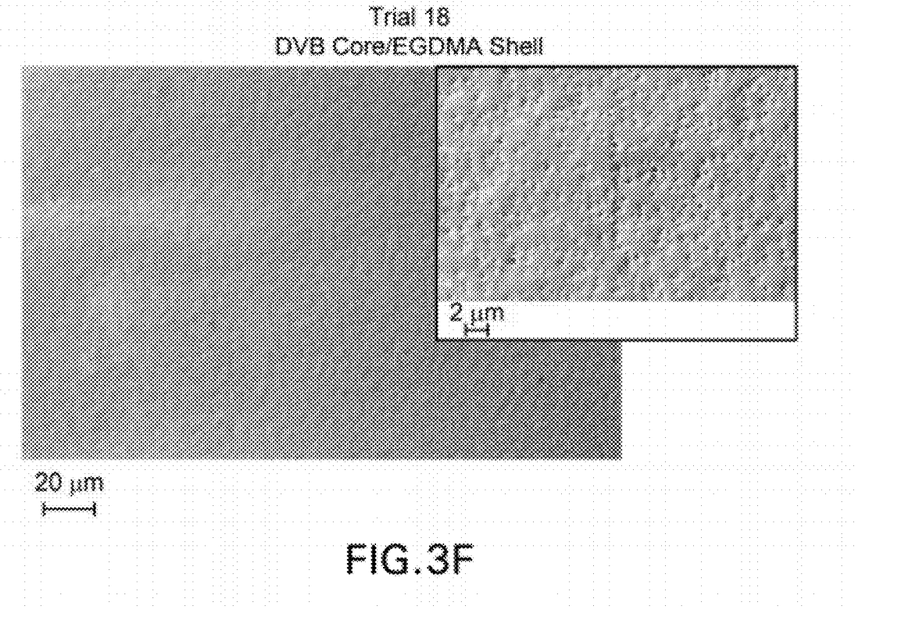
Figure 3G:
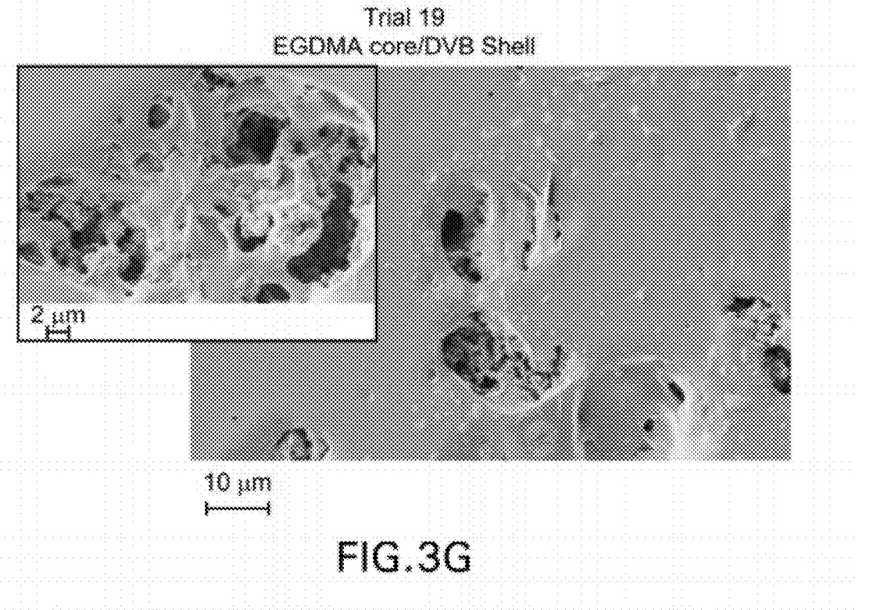
Figure 3H:
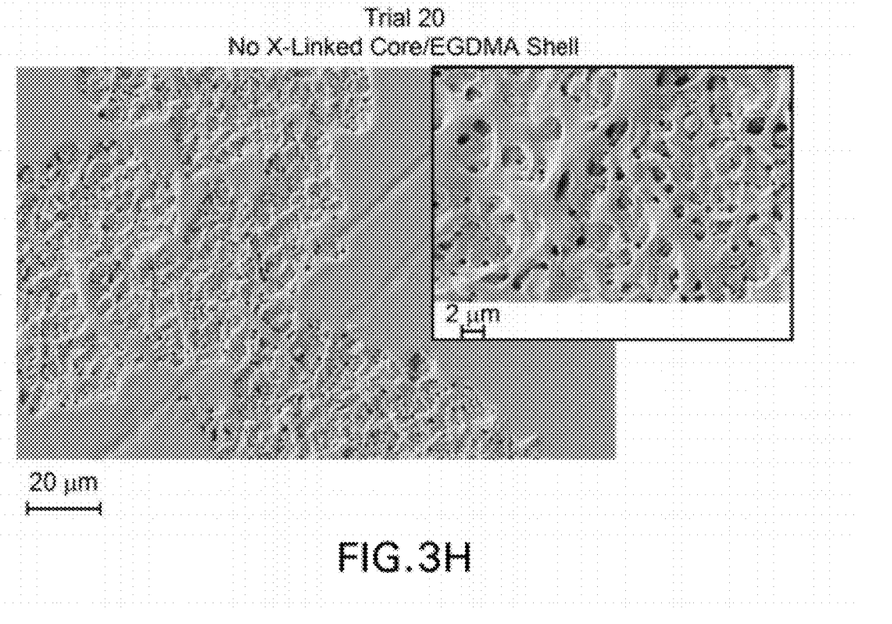
Figure 3I:
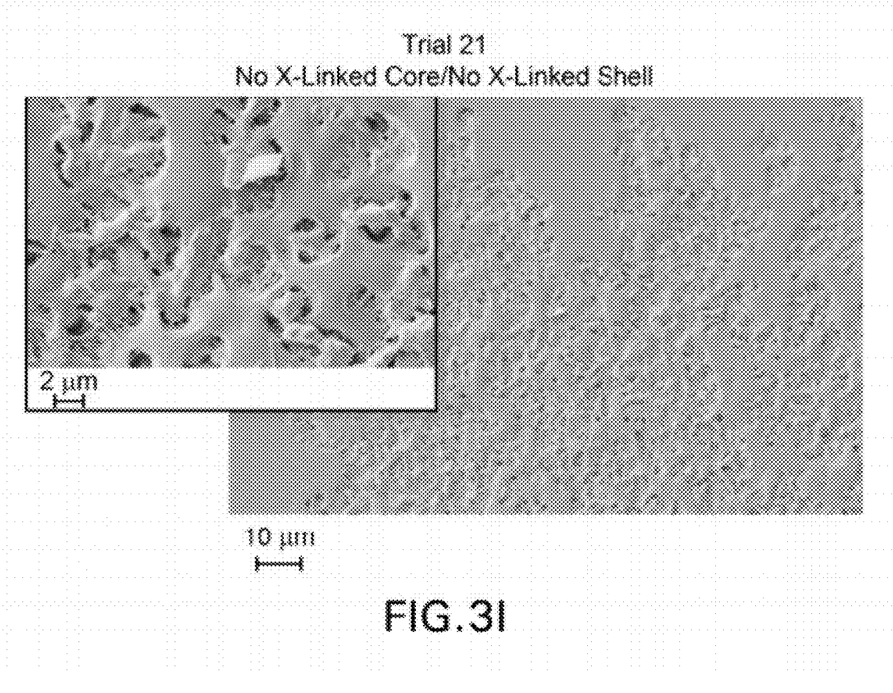

FIG. 2 illustrates the results of Rheology testing as a function of temperature for particle-reinforced epoxy composites having an approximately 9% particle loading. A temperature ramp method was used with a two minute dwell at about 80° C., 100° C., 120° C. on an ARES rheometer. A frequency of about 10 rad/s and an auto adjusted strain (max 80%) was used. The average viscosities of the samples at temperatures within the range between about 75° C. to about 120° C. were measured and compared against the blank resin.

It may be observed that the particles of trial 13 exhibited viscosities that most closely mimicked that of the unreinforced resin. These results indicate that the trial 13 particles are substantially discreet and their interaction with the epoxy resin is minimal. With the exceptions of trials 10 (EGDMA core/no x-linked shell), trial 12 (DVB core/no x-linked shell), and trial 19 (EGDMA core/DVB shell), there appears to only be a slight variation in the rheological properties of the remaining samples of particle-reinforced epoxies, as compared with an unreinforced epoxy.

The high viscosity of trial 19 appears to be due to the high concentration of particle agglomeration. Samples with no cross-linking agent in the shell displayed increased viscosities as compared with those samples having cross-linked shells. These findings indicate that the shell material of the core shell may interact with the epoxy and/or with other core shell particles.

Example 2

Microscopy Study of Particle-reinforced Epoxies

In order to assess the degree of dispersion of the core shell particles within cured resin formulations, samples were prepared using the MY5010 epoxy resin as described above. The samples contained approximately 9% reinforcing particles, by mass. After curing the reinforcing particle-epoxy dispersion for approximately 2 hours at about 180° C., the cured resin plaque was sectioned, mounted, polished, and etched. Notably, the etching process creates a depression within the surface of the resin sample, enabling detection of the presence of the particles but not the particles themselves.

SEM images were acquired as discussed above with respect to the dried latexes. Etching was performed using a mixture of sulfuric acid, phosphoric acid, and potassium permanganate prior to sputter coating. The SEM images, when possible, were taken at approximately 20 μm and 2 μm.

SEM images for epoxies reinforced with the core shell particles of Table 1 are illustrated in FIGS. 3A-3I. Notably, the micrographs from trial 19 (EGDMA core/DVB shell) clearly illustrate large pits, consistent with the presence of clumps of particles (e.g., agglomerates of particles). This observation is consistent with the conclusion of Example 2 that the particles were agglomerated in trial 19. The SEM images from trial 20 (no core/DVB shell) and trial 21 (no x-linked core/EGDMA shell) also appear to show some pitting, although not as pronounced as in trial 19, suggesting that some agglomeration is occurring within these compositions. Trial 10 (EGDMA core/no x-linked shell) also appears to demonstrate a non-uniform distribution of pits, possibly indicating the presence of slight agglomeration.

Example 3

Preliminary Fracture Observations of Particle-reinforced Epoxies

To examine the fracture behavior of particle reinforced epoxies, samples of the particle reinforced epoxies were fractured and the fracture surfaces examined under SEM. Illustrative fracture surfaces are illustrated in FIGS. 4A-4E.

Figure 4A:
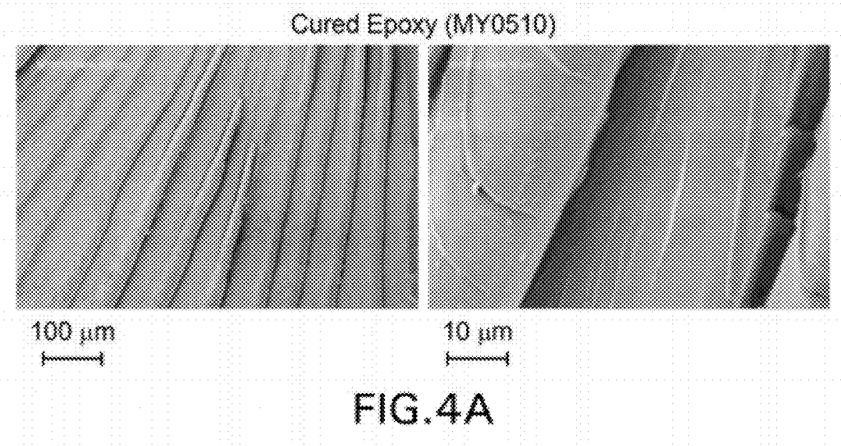
FIGS. 4A-4E presents illustrative scanning electron micrographs of fracture surfaces containing different core shell particles.
Figure 4B:
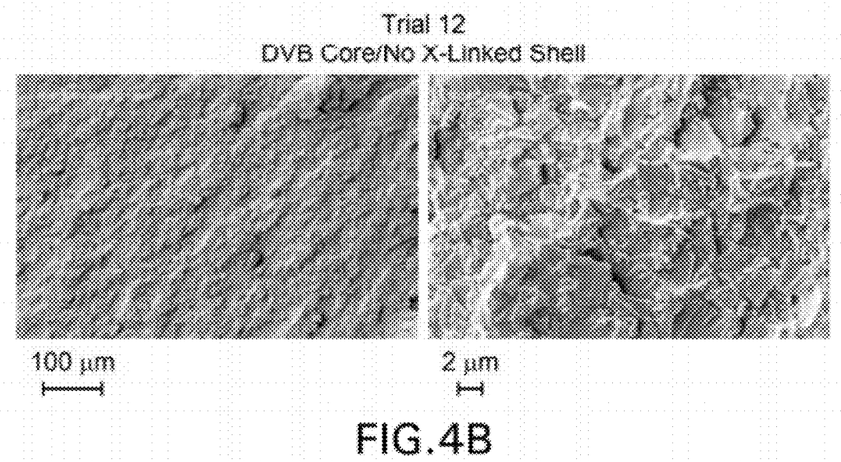
Figure 4C:
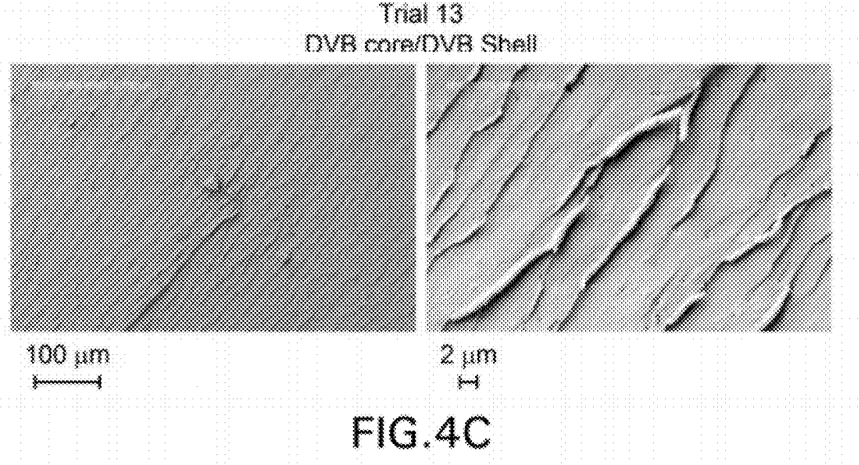
Figure 4D:
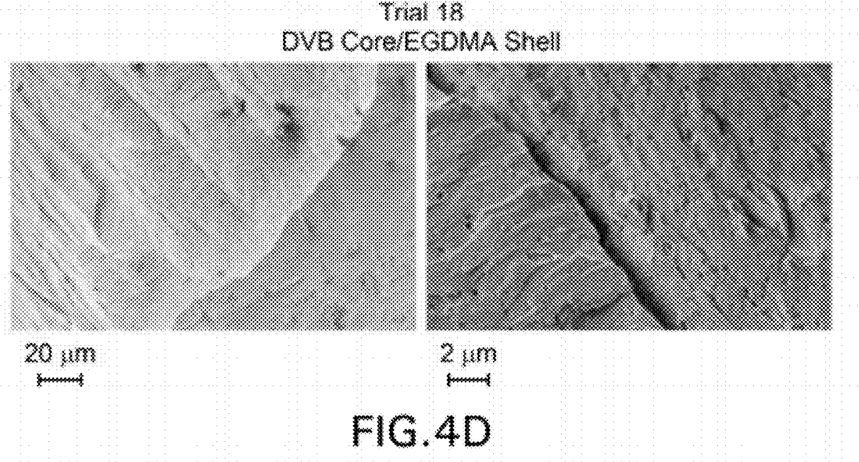
Figure 4E:
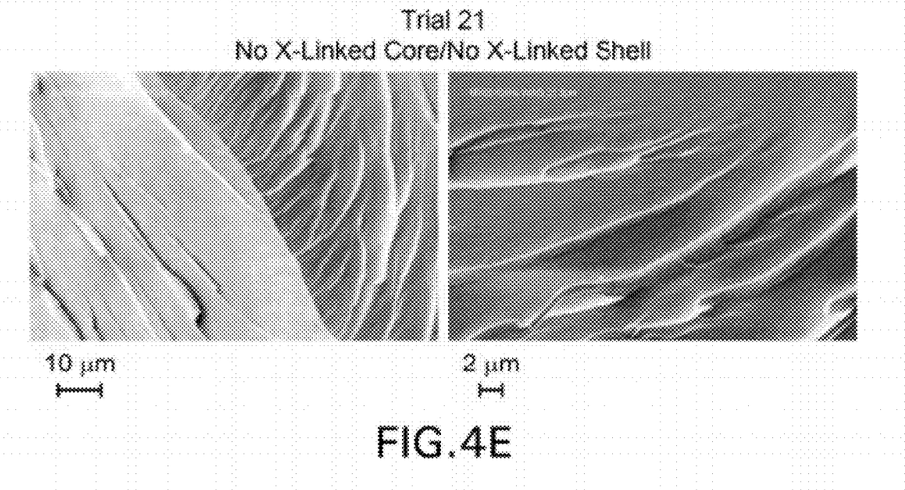

Brittle fracture surfaces may appear as relatively clean, such as that illustrated for the cured, unreinforced epoxy sample of FIG. 4A. In contrast, for materials undergoing ductile fracture, the relatively straight lines may be distorted and curves and scalloping of the material may be seen. It may be observed in FIGS. 4B-4E that the fracture surfaces for trials 12, 13, 18, and 21 demonstrate varying degrees of texture, even though not all of the images show good particulate morphology. These results indicate that the particles are likely to improve the toughness of the resin.

Example 4

Glass Transition (Tg) Behavior of Particle-reinforced Epoxies

Dynamic mechanical thermal analysis (DMTA) was carried out on a TA Instruments Q800 to establish the $T_g$ of cured materials containing the core shell samples. The samples were prepared as discussed above and included particle loadings of approximately 9%. A frequency of approximately 1 Hz was employed with a displacement amplitude of about 40 μm. The DMTA tests were run over temperatures within the range between about 50 to about 300° C. The tests were further repeated on samples that had been boiled in water for about 48 hours so as to determine the reduction in $T_g$ caused by the ingression of water into the epoxy matrix. The benefit of this information is that it provides an indication of how susceptible the material will be to attack by solvents.

TABLE 2

$T_g$ deviation vs. cross-linking type

| Trial | Description | ° C. drop in Tg through particle incorporation into cured resin |
|---|---|---|
|  | No Particle | 0 |
| 11 | EGDMA Core/EGDMA Shell | −2.40 |
| 21 | No X-Linked Core/EGDMA Shell | −2.95 |
| 19 | EGDMA Core/DVB Shell | −3.14 |
| 13 | DVB Core/DVB Shell | −3.30 |
| 18 | DVB Core/EGDMA Shell | −3.36 |
| 10 | EGDMA Core/No X-Linked Shell | −4.12 |
| 20 | No X-Linked Core/DVB Shell | −5.12 |
| 9 | No X-Linked Core/No X-Linked Shell | −5.98 |
| 12 | DVB Core/No X-Linked Shell | −15.17 |

TABLE 3

Hot/Wet $T_g$ deviation vs. cross-linking type

| Trial | Description | ° C. drop in Tg through particle incorporation into cured resin |
|---|---|---|
|  | No Particle | 0 |
| 21 | No X-Linked Core/EGDMA Shell | −3.24 |
| 18 | DVB Core/EGDMA Shell | −3.52 |
| 11 | EGDMA Core/EGDMA Shell | −3.75 |
| 13 | DVB Core/DVB Shell | −4.49 |
| 10 | EGDMA Core/No X-Linked Shell | −4.89 |
| 20 | No X-Linked Core/DVB Shell | −5.28 |
| 19 | EGDMA Core/DVB Shell | −6.30 |
| 9 | No X-Linked Core/No X-Linked Shell | −7.17 |
| 12 | DVB Core/No X-Linked Shell | −15.71 |

Tables 2 and 3 illustrate the % deviation in Tg from the unreinforced cured resin compared to the particle reinforced cured resin for both standard and hot/wet test conditions. The addition of core shell particles to an epoxy should have a relatively small effect on the $T_g$ of the resin if the interaction between the epoxy and the core shell particles is small. It is observed that, under standard test conditions (Table 2), the change in $T_g$ for all particles is less than about 6%, with the exception of trial 12. As previously discussed above, trial 12 shows signs of agglomeration and poor dispersion within the cured resin.

Further examining the $T_g$ deviation of Table 2 in order of smallest to largest deviation, it may further be observed that resins reinforced with cores having EGDMA shells exhibit relatively smaller $T_g$ deviations. This result would appear to indicate that the use of core shells having EGDMA shells, which are relatively less rigid than DVB shells, may reduce the effect of the addition of the core shells on the $T_g$.

Table 3 summarizes hot/wet $T_g$ results for particle-reinforced resins under hot/wet conditions. The results are similar to those found for standard test conditions. With the exception of trial 12, the samples exhibit relatively small deviations in the hot/wet $T_g$ (less than about 8%) as compared with an unreinforced resin. Further, resins reinforced with cores having EGDMA shells exhibit relatively smaller hot/wet $T_g$ deviations, indicating that the use of core shells having EGDMA shells may reduce the effect of the addition of the core shells on the hot/wet $T_g$.

Example 5

Toughness Behavior of Particle-reinforced Epoxies

The toughness ($G_{ic}$) of particle-reinforced resins was examined to determined the influence of the core shell particles on the toughness of resin. Toughness was in accordance with ASTM D5045-99, "Standard Test Method for Plane-Strain Fracture Toughness and Strain Energy Release Rate of Plastic Materials." The toughness testing results are displayed in Table 4 in increasing order.

TABLE 4

Hot/Wet $T_g$ deviation vs. cross-linking type

| Trial | Description | % Increase in $G_{ic}$ (J m$^2$) |
|---|---|---|
| 19 | EGDMA Core/DVB Shell | 171.56 |
| 18 | DVB Core/EGDMA Shell | 154.13 |
| 10 | EGDMA Core/No X-Linked Shell | 143.12 |
| 21 | No X-Linked Core/EGDMA Shell | 138.53 |
| 12 | DVB Core/No X-Linked Shell | 126.61 |
| 20 | No X-Linked Core/DVB Shell | 104.59 |
| 11 | EGDMA Core/EGDMA Shell | 102.75 |
| 13 | DVB Core/DVB Shell | 97.25 |
| 9 | No X-Linked Core/No X-Linked Shell | 63.30 |
|  | No Particle | 0 |

As illustrated in Table 4, toughness is found to increase in each of the samples, from about 170 J/m² in trial 19 to about 63 J/m² in trial 9. This result indicates that the core shell particles are providing a beneficial toughening effect.

Examining the results in greater detail, it is recognized that, owing to possible agglomeration in the sample of trial 19, the toughening mechanism operating in this sample may be different than that operating in the other samples, which exhibited more discrete and dispersed core shell particles. Ignoring this result as a possible outlier, the samples of trials 18, 10, and 21 exhibited the next highest % increase in toughness. Two of these three systems included EGDMA shells, indicating that the use of EGDMA shells, which are relatively less rigid than DVB, may be beneficial in promoting improvements in toughness of the particle reinforced resin.

In summary, embodiments of the present disclosure present systems and methods for preparing particle reinforced polymers that provide particle dispersion and perform well in terms of glass transition and viscosity (e.g., modest changes in glass transition temperature and viscosity). For example, epoxy resins are reinforced with core shell rubber particles. It is further observed that core shell particles with more flexible shells (e.g., EGDMA) may outperform those with a more rigid shell (DVB) in terms of toughness.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of preparing a particle dispersion within a resin, comprising:
   combining an aqueous dispersion of core shell rubber particles with an organic liquid to form a particle mixture;
   adding a resin mixture comprising the same organic liquid and a resin to the particle mixture to form a particle-resin mixture;
   adding a water-soluble salt to the particle-resin mixture to drive the separation of organic and aqueous layers within the particle-resin mixture; and
   substantially removing the separated aqueous layer from the particle-resin mixture.

2. The method of claim 1, wherein the core shell rubber particles are combined with the organic liquid in a proportion ranging between about two parts core shell rubber particles to 0.3 parts organic liquid to about two parts core shell rubber particles to about two parts organic liquid.

3. The method of claim 1, wherein the resin mixture comprises a mixture of the resin and the organic liquid in a proportion ranging between about one part resin to 0.33 parts organic liquid to about one part resin to about one part organic liquid.

4. The method of claim 1, wherein the organic liquid is methyl ethyl ketone.

5. The method of claim 1, wherein the resin is selected from the group consisting of epoxies, benzoxazines, and bismaleimides.

6. The method of claim 1, wherein the salt is selected from the group consisting of sodium chloride, potassium chloride, and lithium chloride.

7. The method of claim 1, wherein the salt is sodium chloride.

8. The method of claim 1, wherein each core shell rubber particle has a core and a shell, the core is formed from a butyl acrylate monomer and the shell is formed from a methyl methacrylate monomer.

9. A method of preparing a particle reinforced composite, comprising:
   providing an aqueous dispersion of core-shell rubber particles, each particle comprising an inner core and an outer shell;
   combining the aqueous dispersion of core shell rubber particles with a first organic liquid;
   adding the combined core shell rubber particles and first organic liquid to a mixture comprising an epoxy monomer and the same first organic liquid to form a particle-epoxy mixture;
   adding a water-soluble salt to the particle-epoxy mixture to induce separation of organic and aqueous layers within the particle-epoxy mixture; and
   removing the separated aqueous layer from the particle-epoxy mixture;
   removing the organic liquid from the particle-epoxy mixture to yield a dispersion of particles in epoxy;
   adding a hardener compound to the dispersion of particles in epoxy; and
   thermally curing the dispersion of particles in epoxy.

10. The method of claim 9, wherein the salt is sodium chloride.

11. The method of claim 9, wherein inducing separation of the organic and aqueous layers does not include addition of a second organic liquid.

12. The method of claim 9, wherein the organic liquid is methyl ethyl ketone.

13. The method of claim 9, wherein the inner core and the outer core of the core shell particle is formed from methacrylate functionalized monomers in an aqueous emulsion polymerization process.

14. The method of claim 9, wherein the core of the core shell rubber particle is formed from a butyl acrylate monomer.

15. The method of claim 9, wherein the shell of the core shell rubber particle is formed from a methyl methacrylate monomer.

16. A method of preparing a dispersion of core shell rubber particles within an epoxy, comprising:
   combining an aqueous dispersion of core shell rubber particles with methyl ethyl ketone to form a particle mixture;
   adding an epoxy mixture comprising methyl ethyl ketone and an epoxy to the particle mixture to form a particle-epoxy mixture;
   adding a water soluble salt to the particle-epoxy mixture to drive the separation of organic and aqueous layers within the particle-epoxy mixture; and
   removing the separated aqueous layer from the particle-epoxy mixture; and
   removing the separated organic layer from the particle-epoxy mixture to yield a dispersion of particles within the epoxy.

17. The method of claim 16, wherein the core shell rubber particles are combined with the methyl ethyl ketone in a proportion ranging between about 2 parts core shell rubber particles to 0.3 parts methyl ethyl ketone to about 2 parts core shell rubber particles to about 2 parts methyl ethyl ketone.

18. The method of claim 16, wherein the epoxy mixture comprises a mixture of the epoxy and the methyl ethyl ketone in a proportion ranging between about one part epoxy to 0.33 parts methyl ethyl ketone to about one part epoxy to about one part methyl ethyl ketone.

19. The method of claim 16, wherein each core shell rubber particle has a core and a shell, the core is formed from a butyl acrylate monomer and the shell is formed from a methyl methacrylate monomer.

* * * * *